W. L. CASPER.
ELECTRIC CIRCUITS.
APPLICATION FILED SEPT. 3, 1919.
1,432,965.
Patented Oct. 24, 1922.
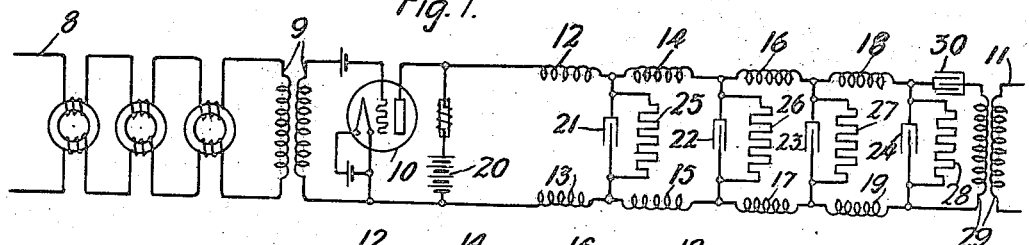
Fig. 1.
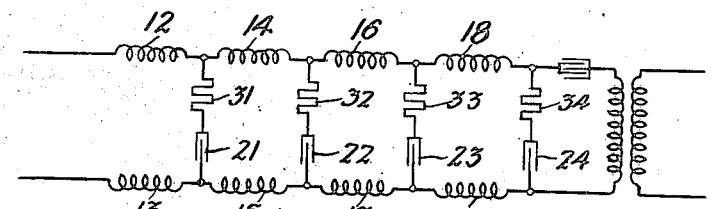
Fig. 2.
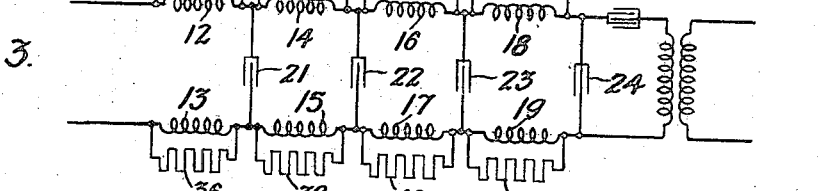
Fig. 3.
Fig. 4.
Fig. 5.
Fig. 6.
Inventor:
William L. Casper.
by J. E. Roberts
Atty.

Patented Oct. 24, 1922.

1,432,965

UNITED STATES PATENT OFFICE.

WILLIAM L. CASPER, OF BROOKLYN, NEW YORK, ASSIGNOR TO WESTERN ELECTRIC COMPANY, INCORPORATED, OF NEW YORK, N. Y., A CORPORATION OF NEW YORK.

ELECTRIC CIRCUITS.

Application filed September 3, 1919. Serial No. 321,448.

*To all whom it may concern:*

Be it known that I, WILLIAM L. CASPER, a citizen of the United States, residing at Brooklyn, in the county of Kings, State of New York, have invented certain new and useful Improvements in Electric Circuits, of which the following is a full, clear, concise, and exact description.

This invention relates to electric circuits in which filters are employed to limit the frequency range that may pass therethrough.

As is well known in the art, it is possible to employ in an electric circuit, a network comprising a plurality of sections, each containing capacity and inductance of such values as to limit the current that may pass therethrough to any range of frequency desired. The manner in which this may be done is described in detail in the patent to Campbell, No. 1,227,113, of May 22, 1917. Thus, if it is desired to eliminate all frequencies above a certain range while transmitting all frequencies below, the inductance elements should be placed in series with the line and the capacity elements should be placed in shunt to the line, thereby forming what is called an ultra-frequency filter. If it is desired to transmit all frequencies above a given value while suppressing all those below, the capacity elements should be placed in series with the line and the inductance elements should be connected in shunt to the line thereby forming an infra-frequency filter.

It has been found, however, that within the range of frequency to be transmitted such a filter does not offer the same attenuation to currents of various frequencies, but that its attenuation increases with the impressed frequencies. This unequal attenuation is due to the fact that the energy loss in the inductance coils is not the same as the energy loss in the condensers of the filter. Generally, the energy loss is higher in the inductance coils than the condensers, although the reverse may sometimes be true. This inequality is often objectionable, particularly in loaded telephone circuits wherein amplifiers are employed, since, in such a case it is desirable to produce equal amplification for all frequencies within the range transmitted through the filter.

In accordance with this invention, it has been found that the attenuation of a filter may be made practically uniform to currents of frequencies within the transmission range by adding resistance to each section of a filter of such a value that the phase angle of the impedance of the series branch of each section is equal to the phase angle of the shunt branch of each section. By phase angle is meant the angle of the impedance whose tangent equals the reactance divided by the resistance. If the filter consists merely of series inductance and shunt capacity, or shunt inductance and series capacity, or if it consists of more than one inductance and capacity for one or both of the section branches, and if one branch is expressed as an equivalent inductance and resistance and the other branch is expressed as an equivalent capacity and conductance, the above-mentioned desired relation for uniform attenuation may be obtained providing the product of the conductance per section of the filter times the inductance per section equals the resistance per section times the capacity per section. In this equation "inductance" represents the value of the inductance in that branch the impedance of which is expressed in terms of effective inductance and resistance; similarly, by resistance is meant the value of the resistance in the branch, the impedance of which is expressed in terms of effective inductance and resistance. Capacity means the value of the capacity in the other branch of each section, the impedance of which is expressed in terms of effective capacity and conductance; and conductance represents the value of the conductance of the last mentioned branch. The above definitions for inductance, resistance, capacity and conductance apply throughout the detailed description of this invention which follows. For the derivation of the above equation reference is made to page 77 of Fleming's book on "The propagation of electric currents in telephone and telegraph conductors". Since, in a filter, either the effective resistance of the inductance or the effective conductance of the capacity may vary with the frequency, in any particular case the value of the resistance per section added is chosen so that this relation holds most accurately for the most important frequencies. Since in the majority of cases the greater energy loss is found in the inductance coils, this relation of the conductance, capacity, resistance and inductance per section may be obtained by inserting a resistance element either in shunt to or in series with the condenser of each filter section so as to change the conductance of the capacity section to the proper value. However, if the energy loss is greater in the capacity elements of the filter, the resistance should be inserted in series or in shunt to the inductance elements, which resistances should be of such values that the above relation is attained.

It has also been found that the desired uniform attenuation may be attained by employing condensers having a dielectric such that the energy loss therethrough is sufficient to produce the above relation between the conductance, capacity, inductance and resistance per section of the filter.

This invention will be better understood by reference to the following detailed description taken in connection with the accompanying drawings, in which Fig. 1 illustrates a loaded telephone line terminating in an ultra-frequency filter, the capacity elements of which are shunted by resistance elements; Fig. 2 shows the resistance element in series with the capacity elements of an ultra-frequency filter; Fig. 3 shows the resistance in shunt to the inductance elements, and Fig. 4 shows the resistance in series with the inductance elements of such a filter; Fig. 5 shows the resistance elements in shunt to the condensers of an infra-frequency filter, and Fig. 6 shows this invention in connection with a band filter.

Referring to Fig. 1, 8 is a loaded line which is associated through a transformer 9 with an amplifier 10. Inserted between the output of amplifier 10 and the outgoing line 11 is an ultra-frequency filter comprising inductance elements 12 to 19 inclusive and capacity elements 21 to 24 inclusive. The last section of the filter is associated with line 11 by means of a transformer 29. A large condenser 30 is placed in series with the primary winding of the transformer in order to prevent battery 20 from being short-circuited. As has been previously stated, such a filter does not offer equal attenuation for all the frequencies within its transmission range so that a filter composed only of these inductance and capacity elements would not impress on line 11 a faithful copy of the speech frequency currents from telephone line 8 that have been amplified by the amplifier 10. In order to overcome this unequal attenuation of the filter, the capacities 21 to 24 inclusive are shunted by the resistance elements 25 to 28 inclusive. Resistance 25 should be of such value that the conductance, inductance, capacity and resistance of the filter section which comprises inductances 12 and 13, capacity 21 and resistance 25 satisfies the relation stated above. Similarly, the resistances 26, 27 and 28 should be of such values as to make the product of the conductance times the inductance of the section in which they are found, equal to the resistance of the section times the capacity of the section. When such a relation exists between the electrical values of the filter sections, line 11 will receive substantially a faithful copy of the signals from line 8 and the attenuation of the filter will be practically independent of the frequency of the signals within its transmission range.

As an example of the values the elements of this filter may have in Fig. 1, it may be stated that in a case where the inductance per section was .87 henry, the effective resistance of the inductance branch was 50 ohms and the capacity per section was .012 microfarads, it was found that the value of the conductance of the capacity branch of each section should be .68 micro-mhos. In order to make the conductance of the capacity branch equal to this value, the resistance shunted around the capacity should be of the order of half a megohm, although its value, of course, will depend upon the conductance of the capacity around which it is shunted. This uniform attenuation may also be attained by inserting the correcting resistance in series with the capacity elements of the filter. Thus in Fig. 2, resistances 31 to 34 inclusive are shown to be in series with the capacity elements 21 to 24 inclusive of a filter similar to the one illustrated in Fig. 1. However, when the resistances are inserted in series with the capacity elements, the value of the resistance need not be as high as in the case where they are in shunt. Thus, for electrical values similar to those given in the example above, for Fig. 1, the resistance which would be necessary to insert in series with each capacity element in the ordinary case, would be only of the order of 100 to 200 ohms.

However, if the energy loss in the condensers is greater than in the inductance elements of the filter, the correcting resistance should be inserted either in shunt or in series with the inductance elements of the filter, and the resistances should have such values that the desired relation is obtained between the conductance, inductance, resistance and capacity per section of the filter. Thus, in Fig. 3, the resistance elements 35 to 42 inclusive are shown in shunt to the inductance elements, while in Fig. 4, the resistance elements 43 to 50 are shown in series with the inductance elements of an ultra-frequency filter similar to the one shown in Fig. 1. Uniform attenuation in other types of filters may also be obtained by adding such values of resistance to the filter sections that the relation noted above exists between the inductance, conductance, capacity and resistance per section of the filter. Thus, in Fig. 5, the resistances 51 to 58 are shown in shunt to the capacity elements of an infra-frequency filter, which is composed of condensers 60 to 67 and inductances 68 to 71, in order that the filter will have a uniform attenuation for all frequencies within its transmission range.

Fig. 6 shows the resistances 72 to 79 added in shunt to the capacity elements of a band filter which comprises capacities 80 to 87 inclusive and tuned circuits 88 to 91 inclusive in order that the band filter may transmit all frequencies within its transmission range with equal attenuation.

Although this invention is shown in connection with filters which are adapted to selectively transmit currents of speech frequencies, it is evident that it may be employed in filters transmitting any desired range, such as radio frequencies.

It is to be understood that this invention is not limited to the particular forms described above, but that it may be variously modified without departing in any-wise from the spirit of this invention as defined in the appended claims.

What is claimed is:

1. In an electric system, a line and an electric filter therefor comprising a plurality of sections, each of said sections comprising a branch in series with said line, and a branch in shunt to said line, each of said branches comprising an impedance element, said impedance elements being of such values that the phase angle of the series branch of each section equals the phase angle of the shunt branch of each section.

2. In an electric system, an electric filter comprising a plurality of sections, each of a plurality of said sections containing inductance, capacity, resistance, and conductance of such values that the product of the conductance times the inductance per section approximately equals the resistance times the capacity per section.

3. In an electric system, an incoming line, an outgoing line, and means interposed between said lines for transmitting with equal attenuation to said outgoing line currents from said incoming line of certain frequencies within a given range, while suppressing currents of frequencies outside said range, said means comprising an electrical network, said network comprising a plurality of sections. each section comprising a branch in series with said lines, and a branch in shunt to said lines, each of said branches comprising an impedance element, said impedances being of such values that the phase angle of the impedance in each series branch equals the phase angle of the impedance in each shunt branch.

4. In an electric system, an electric filter comprising a plurality of sections, each section containing inductance elements and capacity elements, and means comprising a resistance element in each of a plurality of said sections for equalizing the attenuation of said filter for frequencies within the transmission range.

5. In an electric system, an electric filter comprising a plurality of sections, each of said sections containing inductance elements and capacity elements, and means comprising a resistance element in each of said sections of such a value that the product of the conductance and the inductance per section is substantially equal to the resistance times the capacity per section.

6. In an electric system, a localized wave filter comprising an electrically short connecting line composed of a plurality of similar sections, each of a plurality of said sections comprising an inductance element, a capacity element, and a resistance, one of said elements being in shunt to said line, the other of said elements being in series with said line, said resistance being in circuit with said capacity, said elements and said resistances having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

7. In an electric system, a localized wave filter comprising an electrically short connecting line composed of a plurality of similar sections, certain of said sections each comprising an inductance element, a capacity element, and a resistance, one of said elements being in shunt to said line, the other of said elements being in series with said line, said resistance being in shunt to said line and in circuit with said capacity, said elements and said resistances having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

8. In an electric system, a line and an electric filter therefor comprising a plurality of sections, each of said sections comprising an inductance element and a capacity element, one kind of said elements being in series with the line, the other kind of said elements being in shunt to said line, and means for equalizing the attenuation of said filter for all frequencies within its transmission range, said means comprising a resistance element in circuit with the capacity element of each of said sections, said resistance element being also in shunt to said line.

9. In an electric system, a localized wave filter comprising an electrically short connecting line of negligible attenuation composed of a plurality of similar sections, each section comprising an inductance element in series with the line, a capacity element in shunt to said line, and a resistance in shunt to each of said capacities, said inductances, capacities and resistances having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

10. In an electric system, a line and an electric filter therefor comprising a plurality of sections, each of said sections comprising inductance and a capacity, said inductances being in series with said line, said capacities being in shunt to said line, and means for equalizing the attenuation of said filter for all frequencies within its transmission range, said means comprising a resistance in shunt to the capacity of each of said sections, said resistance having such a value that the inductance times the conductance per section equals the capacity times the resistance per section.

11. In an electric system a localized wave filter comprising an electrically short connecting line composed of a plurality of recurring sections, each of said sections comprising an inductance element, a capacity element, and a resistance, each of said inductance elements being in series with said line, said elements and said resistance having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

12. In an electric system, a localized wave filter comprising an electrically short connecting line composed of a plurality of recurring sections, each section comprising inductance, capacity and resistance elements, each of said resistance elements being in shunt to one of said capacity elements, said elements having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

13. In an electric system, a localized wave filter comprising an electrically short connecting line of negligible attenuation composed of a plurality of recurring sections, certain of said sections each comprising inductance, capacity and resistance elements, each of said resistance elements being in shunt to said line, said elements having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

14. In an electric system, a localized wave filter comprising an electrically short connecting line composed of a plurality of recurring sections, each section comprising a capacity element, an inductance element, and a resistance, one of said elements being in series with said line, the other of said elements being in shunt to said line, said resistance being in that branch of each section containing said capacity, said elements and said resistance having such values that said filter transmits with a low and practically constant attenuation currents of all frequencies lying between the upper limiting frequency and the lower limiting frequency of the range of frequencies it is desired to transmit, while approximately extinguishing currents of neighboring frequencies lying outside of said limiting frequencies.

In witness whereof, I hereunto subscribe my name this 28th day of August A. D., 1919.

WILLIAM L. CASPER.